United States Patent [19]
Lin

[11] Patent Number: 5,287,401
[45] Date of Patent: Feb. 15, 1994

[54] APPARATUS AND METHOD FOR A MODEM FOR DETECTING A CALL WAITING SIGNAL

[75] Inventor: Jin-lien Lin, Rancho Cordova, Calif.

[73] Assignee: Intel Corporation, Santa Clara, Calif.

[21] Appl. No.: 31,549

[22] Filed: Mar. 15, 1993

[51] Int. Cl.⁵ .................... H04M 11/00; H04M 3/42
[52] U.S. Cl. ...................................... 379/98; 379/97; 379/93; 379/215
[58] Field of Search ................ 379/93, 94, 96, 97, 379/98, 215; 375/8, 9

[56] References Cited

U.S. PATENT DOCUMENTS

| | | |
|---|---|---|
| 4,431,867 | 2/1984 | Heatherington . |
| 4,841,561 | 6/1989 | Hill .................... 379/97 |
| 4,852,151 | 7/1989 | Dittakavi et al. ............ 379/97 |
| 4,868,863 | 9/1989 | Hartley et al. .............. 379/98 |
| 4,995,074 | 2/1991 | Goldman et al. ............. 379/93 |

FOREIGN PATENT DOCUMENTS

WO8703764  6/1987  PCT Int'l Appl. .

Primary Examiner—Wing F. Chan
Assistant Examiner—Jason Chan
Attorney, Agent, or Firm—Blakely, Sokoloff, Taylor & Zafman

[57] ABSTRACT

A method for having a modem detect a call waiting signal from a telephone network is described. A first signal detector generates a first signal when detecting a carrier signal from the telephone network, and generates a second signal when not detecting the carrier signal. If the first signal detector generates the second signal for a first predetermined time interval and if the first signal detector generates the first signal for a second predetermined time interval subsequent to the first predetermined time interval a second signal detector is connected to the telephone network to detect if energy is present from the telephone network for a third predetermined time interval subsequent to the second predetermined time interval. The call waiting signal is detected when (1) the second signal detector detects the energy from the telephone network throughout the third predetermined time interval, and (2) the second signal detector does not detect the energy from the telephone network after the third predetermined time interval. The apparatus in the modem for detecting the call waiting signal from the telephone network is also described.

20 Claims, 5 Drawing Sheets

APPARATUS AND METHOD FOR A MODEM FOR DETECTING A CALL WAITING SIGNAL

FIELD OF THE INVENTION

The present invention pertains to the field of data communications. More particularly, this invention relates to an apparatus and a method for detecting a call waiting signal in a modulator/demodulator ("modem"), wherein the modem receives the call waiting signal from an external telephone network.

BACKGROUND OF THE INVENTION

When a computer system is connected to a remote computer system via a public telephone network, a modem is typically used to connect the computer system to the telephone network. The function of the modem is to convert a binary digital signal into an analog signal that is suitable for transmission over the telephone network, and to convert an analog signal back into a digital signal.

Occasionally, a situation occurs in which an incoming call to a particular computer system's modem occurs while that modem is connected to another party via the telephone network. Ordinarily, the calling party receives a busy signal and the called party is not aware that a call is being attempted. In order for the calling party to be connected to the called party, the calling party either needs to dial the called party frequently and repeatedly to find out when the called party's line is no longer busy or to call again at some other time.

Repeated redials by the calling party typically unnecessarily increase the traffic in the telephone network. Another problem is that the calling party wastes time in these unsuccessful repeated redials. A further problem is that if the call is important to the called party, the called party will not be able to respond to it promptly because the called party does not know an incoming call is being attempted.

A call waiting feature offered by many telephone companies alerts a person using a telephone for conventional voice communication that a third party is attempting to call the user while the user is still making a call. In such a system, the called party is notified and has the option to interrupt from the ongoing call to take the waiting call. Typically, the telephone company provides the call waiting feature by sending a call waiting signal of a particular frequency to the telephone user via the telephone line. The user typically hears a sound that indicates a call is waiting.

When a modem is used, however, the call waiting signal is typically not recognized by the modem because the modem is not adapted to recognize the call waiting signal during its data conversion and transfer operation. Typically, the modem is only adapted to detect a carrier signal during the data conversion and transfer operation. The carrier signal is the signal sent by another modem via the telephone network that contains information. Typically, the modem includes a data mode filter that is adapted to detect the presence of the carrier signal during the data transfer operation of the modem (i.e., the data mode), and a call progress management filter to detect incoming signals during the modem's call connection operation (i.e., the call progress mode). The call waiting signal is typically not within the bandwidth of the data mode filter, but the call waiting signal is typically within the bandwidth of the call progress management filter.

A prior art scheme of call waiting signal detection for a modem is disclosed to in U.S. Pat. No. 4,852,151, issued Jul. 25, 1989, and entitled MODEM WITH CALL WAITING. That prior art scheme typically switches the data mode filter to the call progress management filter once the data mode filter detects a loss of the carrier signal. If the call progress management filter then detects energy in its bandwidth, the call waiting signal has been detected.

One disadvantage associated with this prior art scheme is that it switches to the call progress management filter as soon as the data mode filter detects a loss of the carrier signal. Sometimes, however, the carrier signal is temporarily lost due to a telephone line transmission problem. If that is so, there would be no call waiting signal and the carrier signal could return at any time. If the data mode filter is switched off because of the loss of the carrier signal, then subsequent data in the carrier signal would not be detected and therefore would be lost.

Another disadvantage of this prior art scheme is that when the call waiting signal has more than one signal cycle, the data mode filter is switched off more than once and the call progress management filter is switched on more than once to detect more than one call waiting signals. This typically results in unnecessary switching during call waiting signal detection.

SUMMARY AND OBJECTS OF THE INVENTION

One object of the present invention is to provide apparatus and a method for call waiting signal detection for a modem of a computer system.

Another object of the present invention is to provide apparatus and a method for call waiting signal detection for a modem of a computer system, wherein the call waiting signal has more than one signal cycle.

A further object of the present invention is to provide apparatus and a method for call waiting signal detection for a modem of a computer system, wherein the possibility of data loss is minimized.

A method for having a modem detect a call waiting signal from a telephone network is described. A first signal detector generates a first signal when detecting a carrier signal from the telephone network and generates a second signal when not detecting the carrier signal. If the first signal detector generates the second signal for a first predetermined time interval and if the first signal detector generates the first signal for a second predetermined time interval subsequent to the first predetermined time intervals then a second signal detector is connected to the telephone network to detect if energy is present from the telephone network for a third predetermined time interval subsequent to the second predetermined time interval. The call waiting signal is detected when (1) the second signal detector detects the energy from the telephone network throughout the third predetermined time interval, and (2) the second signal detector does not detect the energy from the telephone network after the third predetermined time interval.

An apparatus for having a modem detect a call waiting signal is also described. The apparatus includes a first signal detector for detecting a carrier signal from a telephone network. The first signal detector generates a first signal when detecting the carrier signal, and generates a second signal when not detecting the carrier signal. A second signal detector having a second filter detects energy in a call progress bandwidth from the telephone network. The call waiting signal is within the call progress bandwidth. The second signal detector generates a third signal when detecting the energy in the call progress bandwidth. A monitor is coupled to the first and second signal detectors for controlling the first and second signal detectors to detect the call waiting signal from the telephone network. The monitor causes the first signal detector to be disconnected to the telephone network and the second signal detector to be connected to the telephone network when the first signal detector (1) generates the second signal for a first predetermined time interval and (2) the first signal for a second predetermined time interval subsequent to the first predetermined time interval. The monitor generates a signal indicative of receipt of the call waiting signal to the computer system when (1) the second signal detector generates the third signal for a third predetermined time interval subsequent to the second predetermined time interval and (2) the second signal detector does not generate the third signal after the third predetermined time interval.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
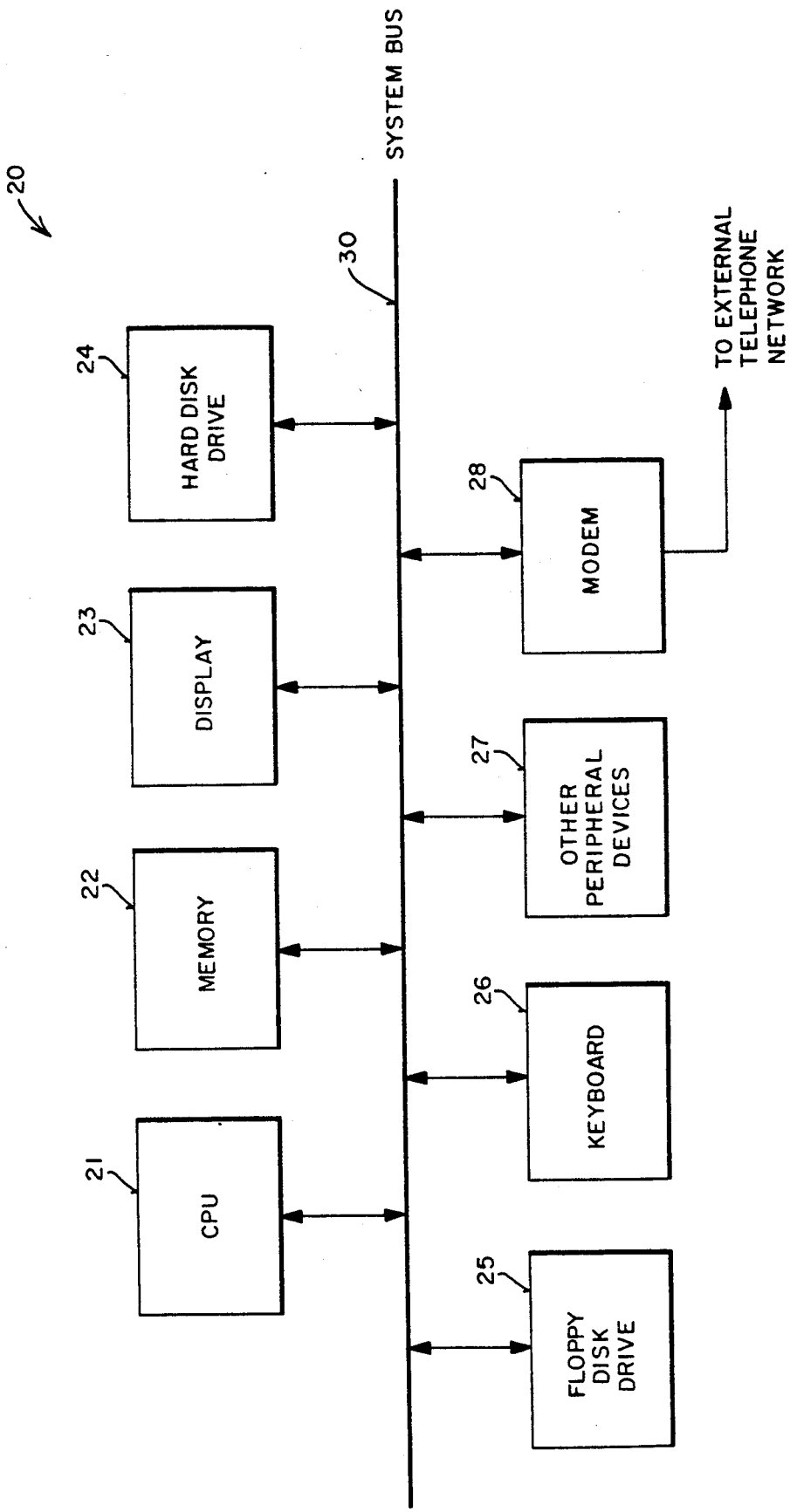
FIG. 1 is a block diagram of a computer system that includes a CPU and a modem.

FIG. 1 schematically illustrates in block diagram form the architecture of a computer system 20 having a modem 28, which implements an embodiment of the present invention.

Figure 2:
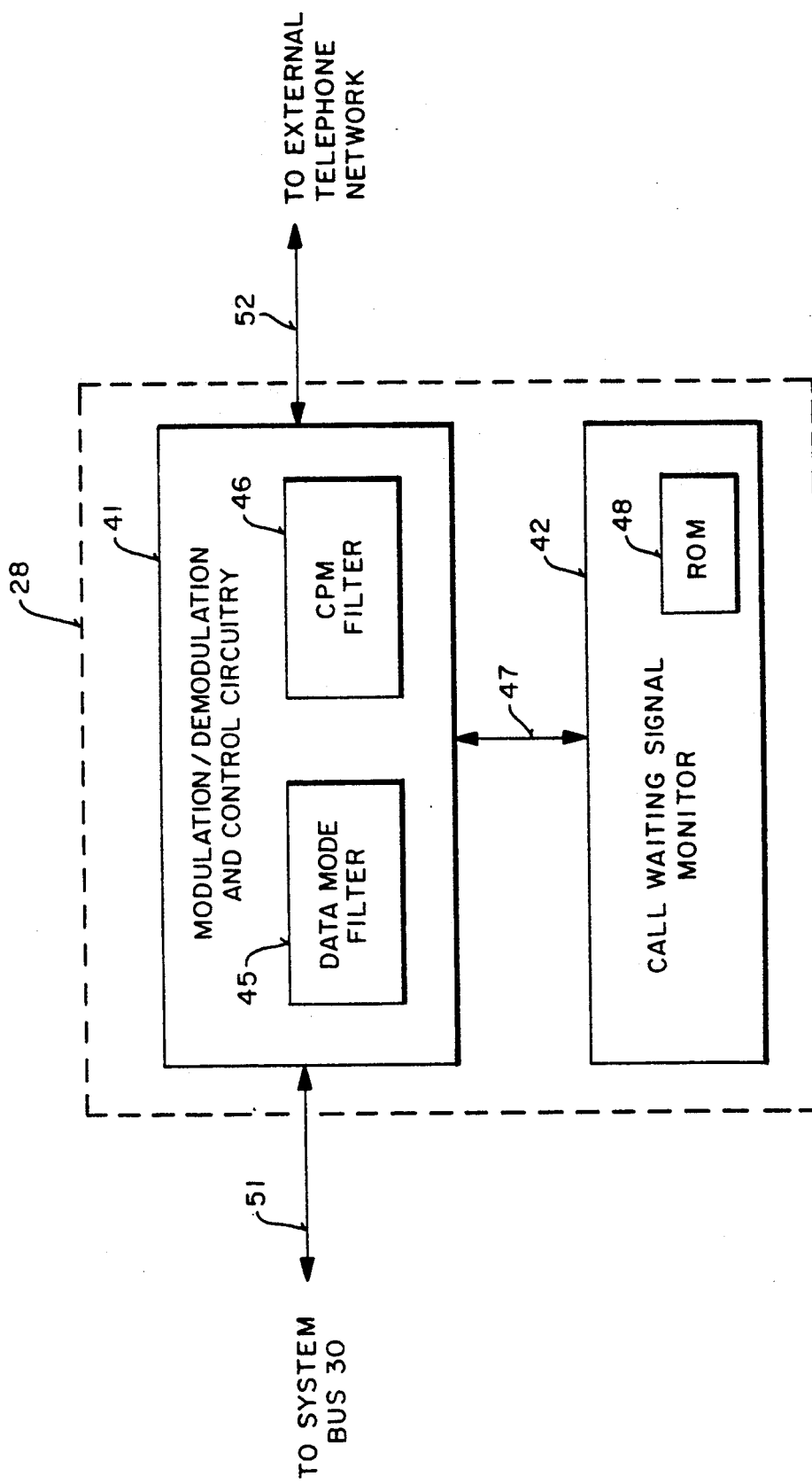
FIG. 2 is a block diagram of the circuitry of the modem of FIG. 1, including a data mode filter, a call progress management filter, and a call waiting signal monitor.

FIG. 2 illustrates in block diagram form the circuitry of modem 28 that includes a circuitry 41 for modulation/demodulation and control. Circuitry 41 includes a data mode filter 45 and a call progress management filter 46.

As will be described in more detail below, modem 28 also includes a call waiting signal monitor 42 for detecting a call waiting signal from an external telephone network.

Referring to FIG. 1, computer system 20, in one embodiment, is a personal computer system. For alternative embodiments, computer system 20 comprises a portable computer, a workstation, a minicomputer, a mainframe, or any other type of computer.

Computer system 20 includes a central processing unit ("CPU") 21. For one embodiment, CPU 21 includes a microprocessor, a co-processor, a cache, and a cache controller for handling access to the cache by the microprocessor.

CPU 21 is coupled to a system bus 30 of computer system 20. System bus 30 is used in computer system 20 as the backplane bus for transfer of data among various components of computer system 20.

Computer system 20 includes memory 22 accessed by CPU 21 via system bus 30. Memory 22 stores programs and data that are needed for the operation of computer system 20. Memory 22 may include random access memories ("RAMs"), read only memories ("ROMs"), EPROMs, flash EPROMs, and other types of memories.

Computer system 20 also includes a floppy disk drive 25, a keyboard 26, a display 23, and a hard disk drive 24 coupled to system bus 30. Computer system 20 also includes other peripheral devices 27 that are connected to system bus 30.

Computer system 20 further includes modem 28. Modem 28 is coupled to bus 30. Modem 28 is also connected to an external telephone network. Modem 28 is used to convert binary digital data stream within computer system 20 into an angle modulated analog signal that is suitable for transmission over the external telephone network. This process is referred to as modulation. Modem 28 also converts the angle modulated analog signal from the external telephone network back to digital form. This process is referred to as demodulation. The operation of modem 28 with respect to its modulation and demodulation function will be briefly described below.

Modem 28 receives binary digital data that are transferred to the external telephone network from bus 30. Modem 28 then modulates the binary digital data through an angle modulation scheme in a frequency band suitable for transmission over a public telephone line. The modulated data is then transferred to another modem at another end of the telephone network.

For one embodiment, the angle modulation is a frequency shift keyed ("FSK") modulation. For another embodiment, the angle modulation is a phase modulation.

When the FSK modulation scheme is employed to modulate the digital data, modem 28 transmits one frequency signal in voice band for a binary zero, for example, and another frequency signal in voice band for binary one.

Modem 28 transfers the modulated data to the telephone network at a certain transfer rate. For one embodiment, the transfer rate of the modulated data from modem 28 is 4800 bits per second. In other embodiments, the transfer rate of the modulated data from modem 28 can be more or fewer than 4800 bits per second. For example, the transfer rate of the modulated data from modem 28 can be 9600 bits per second.

When modem 28 receives modulated data from the telephone network, it demodulates the angle modulated signal back into the digital form.

To perform correctly, modem 28 must match the data communication specification of bus 30 as well as the telephone network. Numerous standards that govern both the mechanical interface and language protocols exist.

For one embodiment, modem 28 employs CCITT standard. For alternative embodiment, modem 28 may employ other standards.

For one embodiment, the external telephone network provides a call waiting feature. The call waiting feature provided by the external telephone network involves sending a call waiting signal to modem 28 when modem 28 is engaged in a data transfer with another modem over the network. The external telephone network sends the call waiting signal between the carrier signal so as to inform modem 28 that a third party is calling. The call waiting signal has a frequency different from that of the carrier signal so that it is distinguishable from the carrier signal.

The call waiting signal has a first make time, a first break time, a second make time, and a second break time. During the make times, the external telephone network sends the call waiting signal. During the break times, the external telephone network sends the carrier signal. The frequency of the call waiting signal falls within the bandwidth of call progress signals.

For one embodiment, the frequency of the call waiting signal is in the range of 270 hertz to 670 hertz. For alternative embodiments, the frequency of the call waiting signal can vary.

For one embodiment, the call waiting signal has a first make time of approximately 0.25 seconds, a first break time of approximately 0.25 seconds, a second make time of 0.25 seconds, and a second break time of approximately 3.25 seconds. The ratio of the first make time and the first break time is referred to as the cadence of the call waiting signal. For alternative embodiments, the make times and the break times can vary.

FIG. 2 illustrates in block diagram form the circuitry of modem 28 of FIG. 1. Modem 28 includes circuitry 41 for modulation/demodulation and control. In addition to handling modulation and demodulation, circuitry 41 also handles call progress management and supervisory functions. The call progress management and supervisory functions include connecting to the telephone network, waiting for a dial tone, performing dialing functions, answering an incoming call, and disconnecting an ongoing call. Circuitry 41 is connected to system bus 30 of computer system 20 (shown in FIG. 1) via line 51. Circuitry 41 is also connected to the external telephone network via line 52.

Modem 28 includes two basic operation modes—namely, a data mode and a call progress management mode. When modem 28 is in the data mode, modem 28 performs the modulation and demodulation function. When modem 28 is in the call progress management mode, modem 28 does not perform any modulation and demodulation functions. Instead, modem 28 responds to commands from computer system 20 and the external telephone network to perform the call progress management and supervisory functions.

Modulation/demodulation and control circuitry 41 includes a data mode filter 45 and a call progress management ("CPM") filter 46. Data mode filter 45 has a bandwidth different from the bandwidth of CPM filter 46. Data mode filter 45 is used in circuitry 41 to detect the presence of a carrier signal from the external telephone network when modem 28 is in the data mode. The external telephone network transmits the data in the carrier signal. CPM filter 46 is used to detect if call progress signals are present during the call progress mode of modem 28.

For one embodiment, the bandwidth of data mode filter 45 is approximately in a range of 1 kilohertz and 2.5 kilohertz and the bandwidth of CPM filter 46 is approximately in a range of 270 hertz to 670 hertz. For alternative embodiments, the bandwidth for filters 45 and 46 can vary.

When modem 28 is in the data mode, circuitry 41 uses data mode filter 45 to detect the presence of the carrier signal via line 52. When data mode filter 45 detects the presence of the carrier signal, circuitry 41 then activates its demodulation function to demodulate the data from the carrier signal. When data mode filter 45 does not detect the carrier signal from line 52, circuitry 41 can disconnect modem 28 with the external telephone network.

Circuitry 41 causes CPM filter 46 to be connected to the external telephone network via line 52 when modem 28 is in the call progress management mode. CPM filter 46 detects energy on line 52 to determine if call progress signals are sent from the external telephone network. The frequencies of these call progress signals are all within the bandwidth of CPM filter 46.

Modem 28 also includes a call waiting signal monitor 42. Call waiting signal monitor 42 controls circuitry 41 to detect the call waiting signal from the external telephone network. Call waiting signal monitor 42 is connected to circuitry 41 via bus 47.

For one embodiment, call waiting signal monitor 42 is implemented at firmware level. For this embodiment, call waiting signal monitor 42 is implemented by storing a set of program instructions for controlling circuitry 41 to detect the call waiting signal in a read only memory ("ROM") 48. For alternative embodiments, call waiting signal monitor 42 can be implemented by other means. For example, call waiting signal monitor 42 can be implemented by a set of logics. The process of call waiting signal monitor 42 for controlling circuitry 41 to detect the call waiting signal will be described in detail below, in conjunction with FIG. 3. FIG. 4 illustrates the state diagram of call waiting signal monitor 42 to detect the call waiting signal, which will also be described in detail below.

Figure 5:
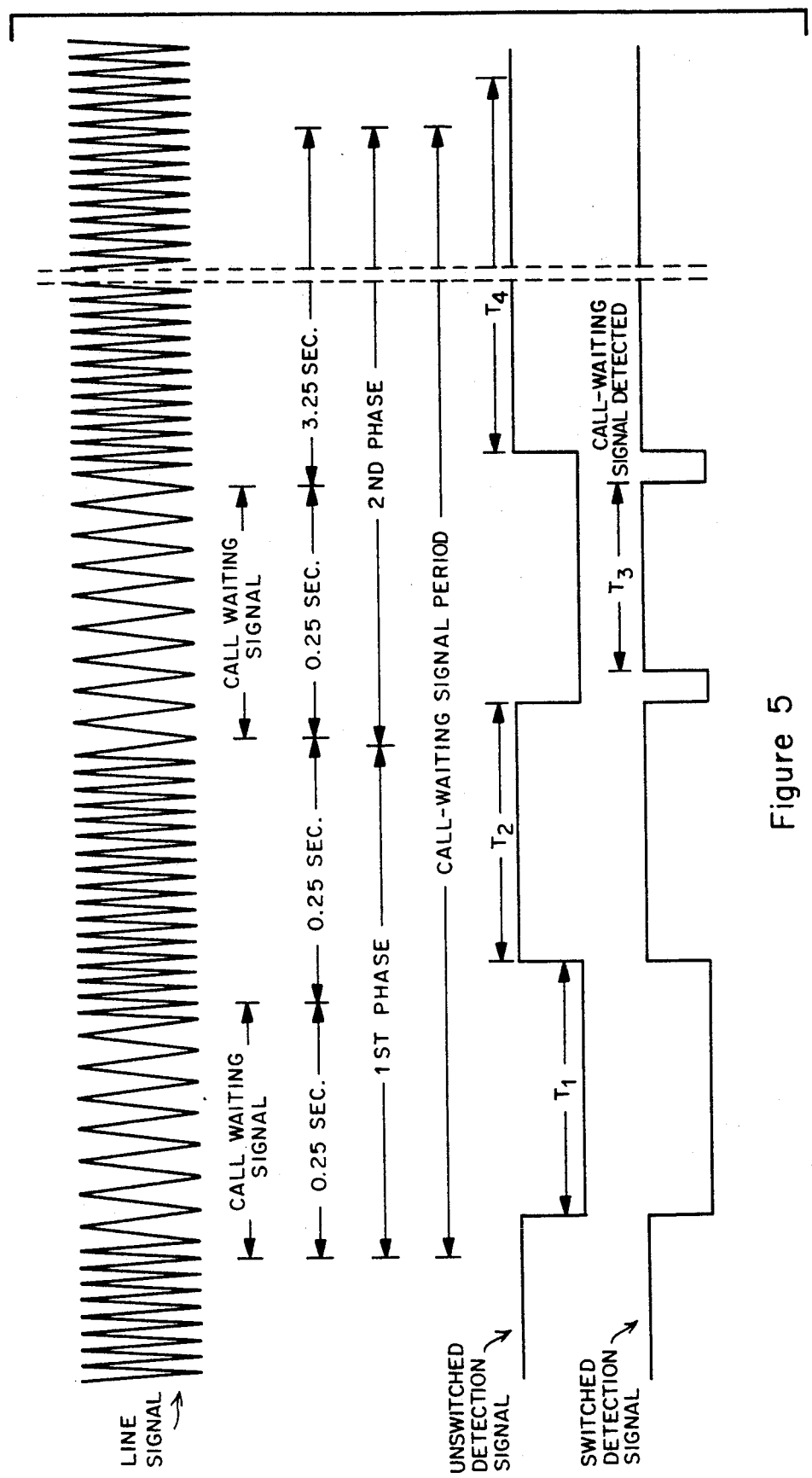
FIG. 5 is a waveform diagram illustrating the line signal received by the modem and the energy detection signal with and without bandswitching.

FIG. 5 illustrates the waveforms of the signal on line 52, the unswitched detection signal and the switched detection signal.

Referring to FIGS. 2 and 5, during data mode, circuitry 41 causes data mode filter 45 to be connected to the external telephone network via line 52 to detect the carrier signal. Because the call waiting signal is not within the bandwidth of data mode filter 45, filter 45 does not detect energy on line 52 when the external telephone network sends the call waiting signal to modem 28.

When data mode filter 45 loses the carrier signal on line 52, filter 45 generates a first indication signal to call waiting signal monitor 42 via bus 47. Call waiting signal monitor 42 then counts a first time period $T_1$ (i.e., the first make time) during which data mode filter 45 does not detect the carrier signal. When filter 45 detects the carrier signal again, filter 45 generates a second indication signal to call waiting signal monitor 42. Monitor 42 then counts a second time period $T_2$ (i.e., the first break time) during which filter 45 detects the carrier signal before losing the carrier signal again.

When data mode filter 45 loses the carrier signal again at the end of the $T_2$ time period, calling waiting signal monitor 42 compares the first time period $T_1$ with the second time period $T_2$ to obtain a ratio of the two time periods.

If the ratio of the two time periods does not match the cadence of the call waiting signal, monitor 42 determines that the call waiting signal is not transmitted to modem 28 via line 28 and the loss of the carrier signal by filter 45 is not caused by the transmission of the call waiting signal. Call waiting signal monitor 42 then does not switch the connection of line 52 from data mode filter 45 to CPM filter 46.

When the ratio of the two time periods equals one, which matches the cadence of the call waiting signal, call waiting signal monitor 42 causes data mode filter 45 to be disconnected with line 52 and CPM filter 46 to be connected to line 52. Meanwhile, call waiting signal monitor 42 starts to count the third time period $T_3$ during which CPM filter 46 detects the energy from line 52.

When CPM filter 46 detects energy from line 52 during the third time period $T_3$, filter 46 signals call waiting signal monitor 42. At this time, call waiting signal monitor 42 determines that the call waiting signal is detected. Monitor 42 then notifies computer 20 via lines 47 and 51. Then, call waiting signal monitor 42 causes data mode filter 45 to be connected with line 52 again.

The third time period $T_3$ is also used to determine if the call waiting signal is detected. Call waiting signal monitor 42 determines that the call waiting signal is detected only when the third time period $T_3$ is close to the second make time of the call waiting signal. When the third time period is longer than the second make time, monitor 42 does not detect the call waiting signal and will not notify computer 20.

The detection of the second break time is optional. For one embodiment, monitor 42 waits for a short period of time to cause data mode filter 45 to be connected to line 52 after the call waiting signal is detected. For an alternative embodiment, the second break time is detected such that the detection of the call waiting signal is further ensured.

Figure 3:
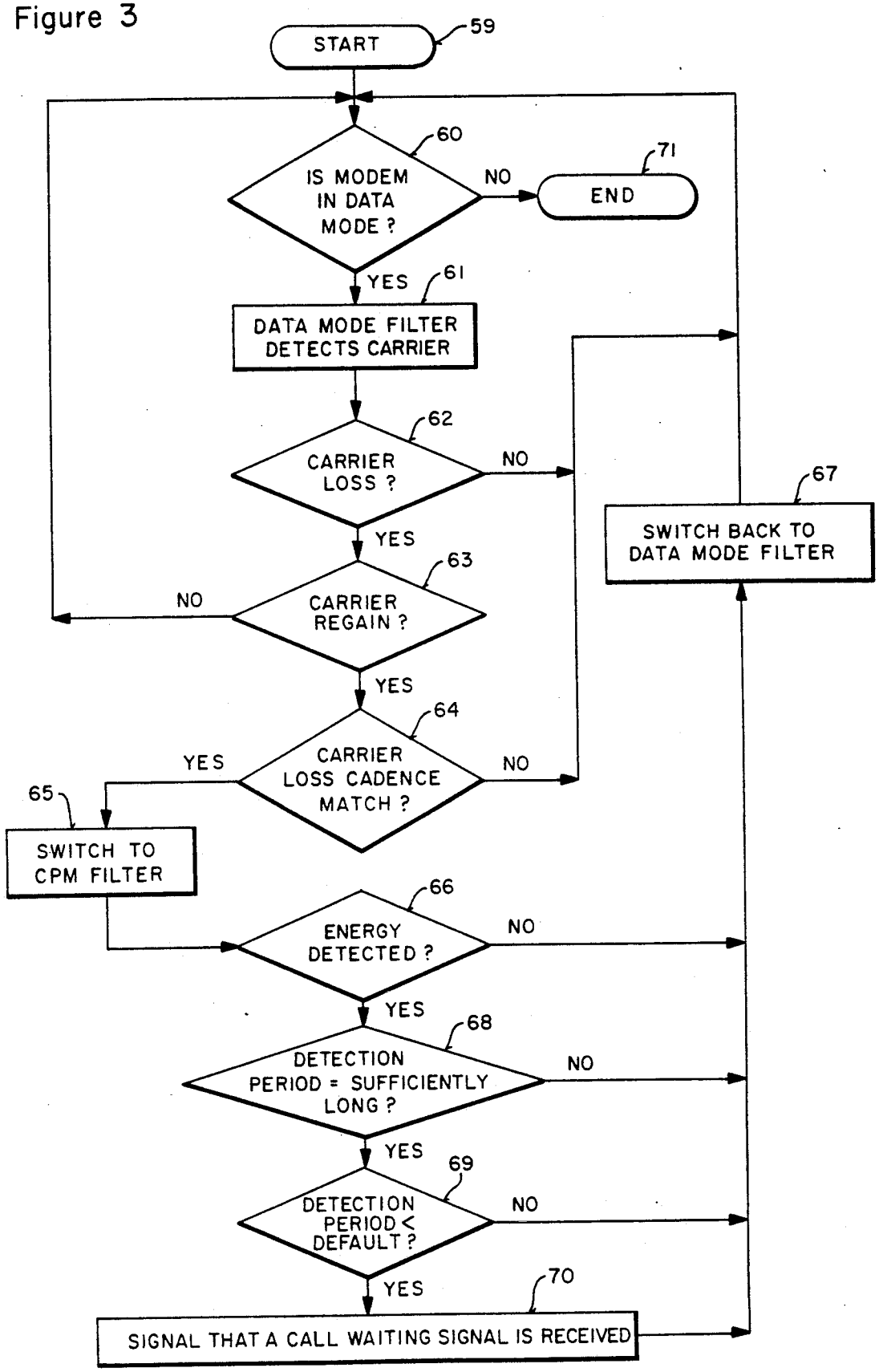
FIG. 3 is a flow chart diagram that shows the process with respect to the call waiting signal monitor with respect to detecting a call waiting signal.
Figure 4:
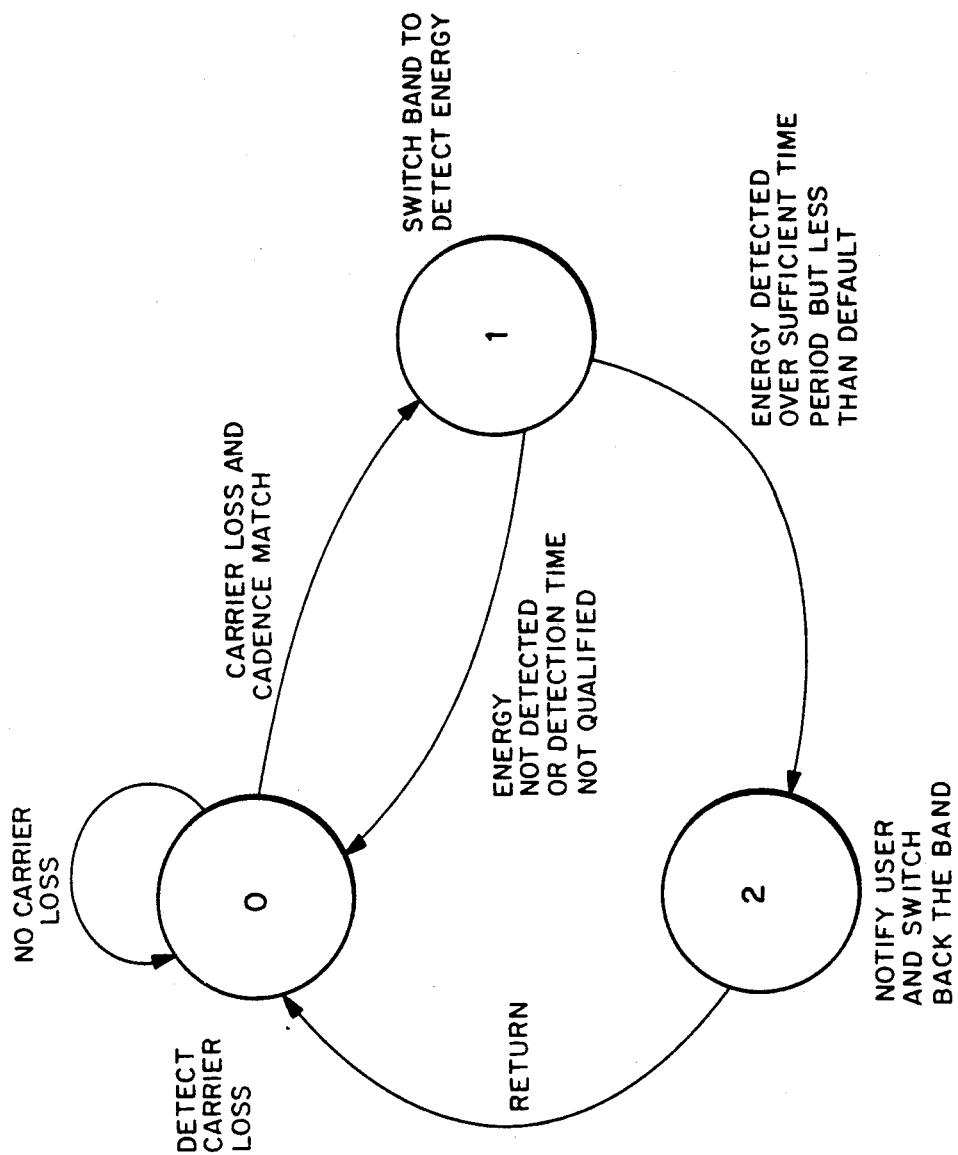
FIG. 4 is a state diagram of the call waiting signal monitor.

FIG. 3 illustrates in flow chart diagram form the process of detecting the call waiting signal in call waiting signal monitor 42. In FIG. 3, the process starts at step 59. At step 60, a judgment is made to determine whether modem 28 is in the data mode. If modem 28 is not in the data mode, the process exits at step 71. If modem 28 is in the data mode, step 61 is performed. At step 61, call waiting signal monitor 42 causes data mode filter 45 to detect the carrier signal. At step 62, a judgment is made to determine whether data mode filter 45 loses the carrier signal. If data mode filter 45 does not lose the carrier signal, step 62 is repeated. If data mode filter 45 loses the carrier signal, step 63 is performed to determine if the carrier signal is again detected by data mode filter 45. If the carrier signal is no longer detected, which indicates that modem 28 is disconnected from the external telephone network, the process returns to step 60. If, however, the carrier signal is regained by data mode filter 45 at step 63, step 64 is performed to determine if the carrier signal is lost again and the ratio of the two time periods matches the cadence of the call waiting signal. If the ratio does not match the cadence of the call waiting signal, then the signal is not the call waiting signal and the process returns to step 60. If the carrier signal is lost again and the ratio is determined to match the cadence at step 64, then step 65 is performed to switch the connection of the network to CPM filter 46.

At step 66, a determination is made to decide if energy is detected in CPM filter 46. If CPM filter 46 does not detect energy in its bandwidth, then the call waiting signal is not detected and step 67 is performed where data mode filter 45 is switched back. The process then returns to step 60. If, at step 66, CPM filter 46 detects the energy, step 68 is performed to determine if the detection period is sufficiently long. If the detection period is not sufficiently long, then the call waiting signal is not detected and step 67 is performed. If the detection period is sufficiently long, then step 69 is performed to determine if the detection time is smaller than a default value. In one embodiment, the default value is set to be greater than the second make time of the call waiting signal. If the detection period is greater than the default value, then step 67 is performed. If the detection period is smaller than the default value, then step 70 is performed in which call waiting signal monitor 42 signals computer 20 that a call waiting signal is received. Call waiting signal monitor 42 then causes the connection of data mode filter 45 to be switched back to line 52 at step 67. The process then returns to step 60.

Referring to FIG. 4, the state diagram of calling waiting signal monitor 42 is shown. In state "0," call waiting signal monitor 42 waits for data mode filter 45 to detect the loss of the carrier signal. When monitor 42 determines that data mode filter 45 detects the loss of the carrier signal and that the first make and break times match the cadence of the first phase of the call waiting signal, call waiting signal monitor 42 then moves to state "1" in which monitor 42 causes data mode filter 45 to be disconnected to line 52 and CPM filter 46 to be connected to line 52. If CPM filter 46 does not detect energy in its bandwidth or the detection time does not qualify for the detection of the call waiting signal, monitor 42 returns to state "0" from state "1." If CPM filter 46 detects the energy over sufficient time and less than the default value, monitor 42 moves to state "2" in which computer 20 is notified and data mode filter 45 is connected back to line 52. Monitor 42 then returns to state "0" from state "2."

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for having a modem detect a call waiting signal from a telephone network, comprising:
   (A) first signal detection circuitry for detecting a carrier signal from the telephone network, wherein the first signal detection circuitry generates a first signal when detecting the carrier signal, and generates a second signal when not detecting the carrier signal;
   (B) second signal detection circuitry for detecting energy in a call progress bandwidth from the telephone network, wherein the call waiting signal is within the call progress bandwidth, wherein the second signal detection circuitry generates a third signal when detecting the energy in the call progress bandwidth;
   (C) monitoring circuitry coupled to the first and second detection circuitry for controlling the first and second signal detection circuitry to detect the call waiting signal from the telephone network, wherein the monitoring circuitry causes the first signal detection circuitry to be disconnected from the telephone network and the second signal detection circuitry to be connected to the telephone network when the first signal detection circuitry generates (1) the second signal for a first predetermined time interval and (2) the first signal for a second predetermined time interval subsequent to the first predetermined time interval, wherein the monitoring circuitry generates a signal indicative of receipt of the call waiting signal to a data processing system when (3) the second signal detection circuitry generates the third signal for a third predetermined time interval subsequent to the second predetermined time interval and (4) the second signal detection circuitry does not generate the third signal after the third predetermined time interval.

2. The apparatus of claim 1, wherein the monitoring circuitry further comprises a set of program instructions stored in a read only memory.

3. The apparatus of claim 1, wherein the monitoring circuitry causes the second signal detection circuitry to be connected to the telephone network if and only if the first signal detection circuitry generates (1) the second signal for the first predetermined time interval, (2) the first signal for the second predetermined time interval subsequent to the first predetermined time interval, and (3) the second signal after the second predetermined time interval.

4. The apparatus of claim 1, wherein the monitoring circuitry determines whether the second signal detection circuitry generates the third signal during a fourth predetermined time interval immediately following the third predetermined time interval, wherein if the monitoring circuitry determines that the second signal detection circuitry does not generate the third signal during the fourth predetermined time interval, then the monitoring circuitry (1) generates the signal indicative of receipt of the call waiting signal and (2) causes the first signal detection circuitry to be connected to the telephone network and the second signal detection circuitry to be disconnected from the telephone network after the fourth predetermined time interval.

5. The apparatus of claim 4, wherein the first predetermined time interval is 0.25 seconds, the second predetermined time interval is 0.25 seconds, the third predetermined time interval is 0.25 seconds, and the fourth predetermined time interval is 3.25 seconds, wherein the call waiting signal is a dual tone call waiting signal.

6. A method for having a modem detect a call waiting signal, wherein the modem is coupled to a telephone network, wherein the method comprises the steps of:
(A) generating a first signal if a first signal detector of the modem detects a carrier signal from the telephone network, and generating a second signal if the first signal detector does not detect the carrier signal from the telephone network;
(B) if the first signal detector generates the second signal for a first predetermined time interval and if the first signal detector generates the first signal for a second predetermined time interval subsequent to the first predetermined time interval then detecting the call waiting signal in the telephone network by connecting a second signal detector of the modem to the telephone network to detect energy from the telephone network for a third predetermined time interval, subsequent to the second predetermined time interval, wherein the call waiting signal is detected when (1) the second signal detector detects the energy from the telephone network throughout the third predetermined time interval, and (2) the second signal detector does not detect the energy from the telephone network after the third predetermined time interval.

7. The method of claim 1, further comprising the step of causing the modem to notify a data processing system that the call waiting signal is detected when the energy is detected by the second signal detector for the third predetermined time interval.

8. The method of claim 1, wherein the step (B) connects the second signal detector to the telephone network to detect the energy from the telephone network for the third predetermined time interval if and only if the first signal detector generates (1) the second signal for the first predetermined time interval and (2) the first signal for the second predetermined time interval subsequent to the first predetermined time interval.

9. The method of claim 1, wherein the step (B) further comprises the steps of
(i) determining whether the second signal detector detects the energy during a fourth predetermined time interval subsequent to the third predetermined time interval if the energy is detected by the second signal detector from the telephone network for the third predetermined time interval;
(ii) if the second signal detector does not detect the energy during the fourth predetermined time interval, then
(1) causing the modem to generate a signal to a data processing system, indicating receipt of the call waiting signal;
(2) causing the first signal detector to be connected to the telephone network and the second signal detector to be disconnected from the telephone network;
(iii) if the second signal detector detect the energy during the fourth predetermined time interval, then causing the first signal detector to be connected to the telephone network and the second signal detector to be disconnected from the telephone network without causing the modem to generate the signal indicating receipt of the call waiting signal to the data processing system.

10. The method of claim 9, wherein the first predetermined time interval is 0.25 seconds, the second predetermined time interval is 0.25 seconds, the third predetermined time interval is 0.25 seconds, and the fourth predetermined time interval is 3.25 seconds.

11. The method of claim 1, wherein the call waiting signal is a dual tone call waiting signal.

12. An apparatus for having a modem detect a call waiting signal from a telephone network, comprising:
(A) a first signal detector having a first filter for detecting a carrier signal from the telephone network, wherein the first signal detector generates a first signal when detecting the carrier signal, and generates a second signal when not detecting the carrier signal;
(B) a second signal detector having a second filter for detecting energy in a call progress bandwidth from the telephone network, wherein the call waiting signal is within the call progress bandwidth, wherein the second signal detector generates a third signal when detecting the energy in the call progress bandwidth;

(C) a monitor having a set of program instructions and coupled to the first and second signal detectors for controlling the first and second signal detectors to detect the call waiting signal from the telephone network, wherein the monitor causes the first signal detector to be disconnected to a telephone network and the second signal detector to be connected to the telephone network when the first signal detector generates (1) the second signal for a first predetermined time interval and (2) the first signal for a second predetermined time interval subsequent to the first predetermined time interval, wherein the monitor generates a signal indicative of receipt of the call waiting signal to the data processing system when (3) the second signal detector generates the third signal for a third predetermined time interval subsequent to the second predetermined time interval and (4) the second signal detector does not generate the third signal after the third predetermined time interval. wherein the monitor causes the first signal detector to be disconnected to a telephone network and the second signal detector to be connected to the telephone network when the first signal detector generates (1) the second signal for a first predetermined time interval and (2) the first signal for a second predetermined time interval subsequent to the first predetermined time interval, wherein the monitor generates a signal indicative of receipt of the call waiting signal to the data processing system when (3) the second signal detector generates the third signal for a third predetermined time interval subsequent to the second predetermined time interval and (4) the second signal detector does not generate the third signal after the third predetermined time interval.

13. The apparatus of claim 12, wherein the monitor causes the second signal detector to be connected to the telephone network if and only if the first signal detector generates (1) the second signal for the first predetermined time interval, (2) the first signal for the second predetermined time interval subsequent to the first predetermined time interval, and (3) the second signal after the second predetermined time interval.

14. The apparatus of claim 12, wherein the monitor determines whether the second signal detector generates the third signal during a fourth predetermined time interval subsequent to the third predetermined time interval, wherein if the monitor determines that the second signal detector does not generate the third signal during the fourth predetermined time interval, then the monitor (1) generates the signal indicative of receipt of the call waiting signal and (2) causes the first signal detector to be connected to the telephone network and the second signal detector to be disconnected from the telephone network after the fourth predetermined time interval.

15. The apparatus of claim 14, wherein the first predetermined time interval is 0.25 seconds and the second predetermined time interval is 0.25 seconds, wherein the fourth predetermined time interval is 3.25 seconds, wherein the call waiting signal is a dual tone call waiting signal.

16. A computer system, comprising:
(A) a system bus;
(B) a memory coupled to the system bus;
(C) a central processing unit (CPU) coupled to the system bus;
(D) a plurality of peripheral devices, each of which being coupled to the system bus;
(E) a modem coupled to the system bus for coupling the computer system to an external telephone network;
(F) call waiting signal detection circuitry in the modem for detecting a call waiting signal from the telephone network, wherein the call waiting signal detection circuitry comprises
  (i) first signal detection circuitry for detecting a carrier signal from the telephone network, wherein the first signal detection circuitry generates a first signal when detecting the carrier signal, and generates a second signal when not detecting the carrier signal;
  (ii) second signal detection circuitry for detecting energy in a call progress bandwidth from the telephone network, wherein the call waiting signal from the telephone network is within the call progress bandwidth, wherein the second signal detection circuitry generates a third signal when detecting the energy in the call progress bandwidth;
  (iii) monitoring circuitry coupled to the first and second detection circuitry for controlling the first and second signal detection circuitry to detect the call waiting signal from the telephone network, wherein the monitoring circuitry causes the first signal detection circuitry to be disconnected from the telephone network and the second signal detection circuitry to be connected to the telephone network when the first signal detection circuitry generates (1) the second signal for a first predetermined time interval and (2) the first signal for a second predetermined time interval subsequent to the first predetermined time interval, wherein the monitoring circuitry generates a signal indicative of receipt of the call waiting signal to a data processing system when (3) the second signal detection circuitry generates the third signal for a third predetermined time interval subsequent to the second predetermined time interval and (4) the second signal detection circuitry does not generate the third signal after the third predetermined time interval.

17. The computer system of claim 16, wherein the monitoring circuitry further comprises a set of program instructions stored in a read only memory.

18. The computer system of claim 16, wherein the monitoring circuitry causes the second signal detection circuitry to be connected to the telephone network if and only if the first signal detection circuitry generates (1) the second signal for the first predetermined time interval and (2) the first signal for the second predetermined time interval subsequent to the first predetermined time interval.

19. The computer system of claim 16, wherein the monitoring circuitry determines whether the second signal detection circuitry generates the third signal during a fourth predetermined time interval subsequent to the third predetermined time interval, wherein if the monitoring circuitry determines that the second signal detection circuitry does not generate the third signal during the fourth predetermined time interval, then the monitoring circuitry (1) generates the signal indicative of receipt of the call waiting signal and (2) causes the first signal detection circuitry to be connected to the telephone network and the second signal detection circuitry to be disconnected from the telephone network after the fourth predetermined time interval.

20. The computer system of claim 19, wherein the first predetermined time interval is 0.25 seconds, the second predetermined time interval is 0.25 seconds, the third predetermined time interval is 0.25 seconds, and the fourth predetermined time interval is 3.25 seconds, wherein the call waiting signal is a dual tone call waiting signal.

* * * * *